W. J. DICKINSON AND A. H. STARK.
MOTIVE POWER MEANS FOR UTILIZING THE ENERGY OF AIR CURRENTS.
APPLICATION FILED FEB. 21, 1918.

1,312,021.

Patented Aug. 5, 1919.
2 SHEETS—SHEET 1.

Inventors:
William John Dickinson,
Arthur Herbert Stark,
By Henry Otto Jr.
Atty.

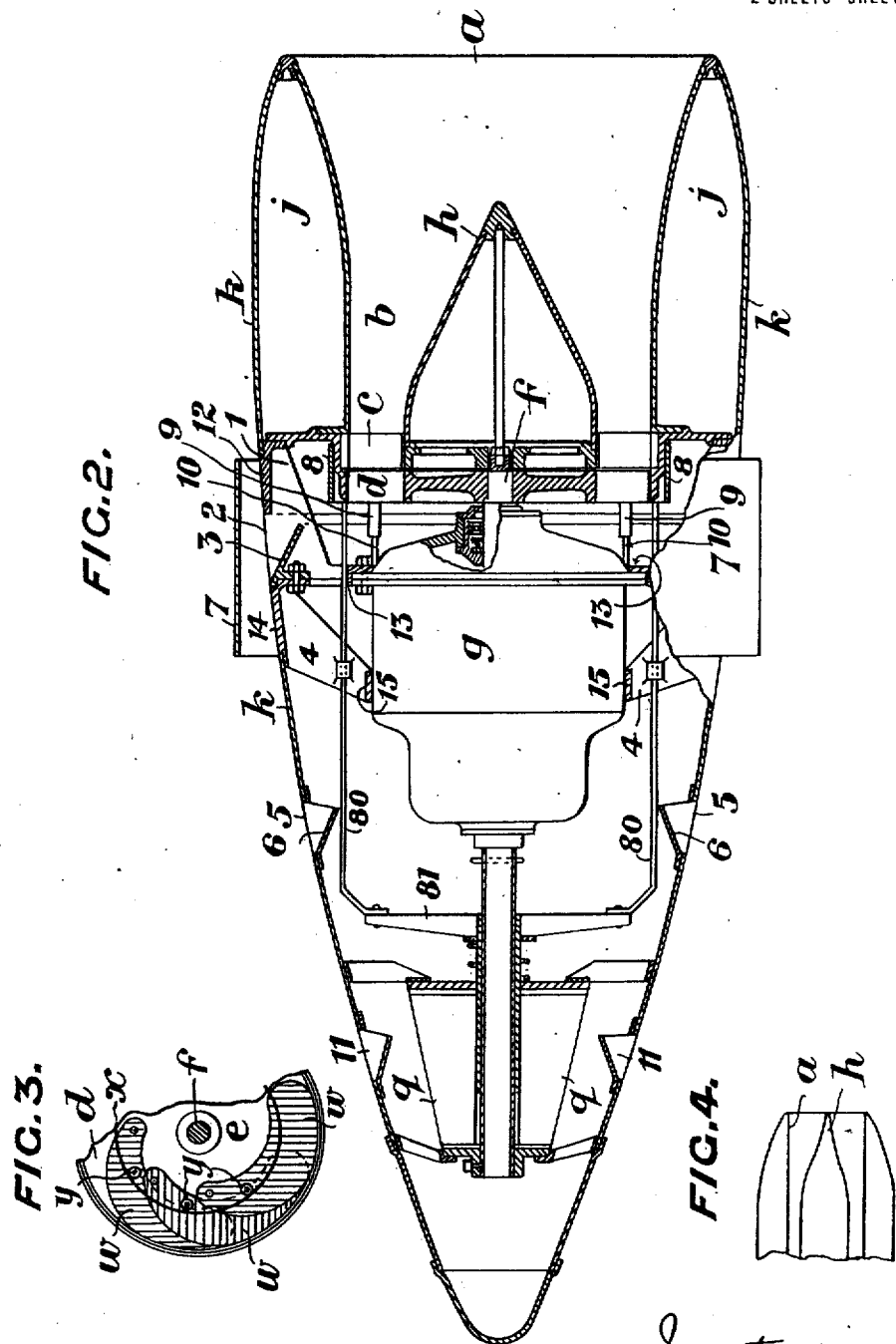

UNITED STATES PATENT OFFICE.

WILLIAM JOHN DICKINSON, OF ERITH, AND ARTHUR HERBERT STARK, OF LEYTONSTONE, ENGLAND.

MOTIVE-POWER MEANS FOR UTILIZING THE ENERGY OF AIR-CURRENTS.

1,312,021.

Specification of Letters Patent.　　Patented Aug. 5, 1919.

Application filed February 21, 1918. Serial No. 218,602.

*To all whom it may concern:*

Be it known that we, WILLIAM JOHN DICKINSON and ARTHUR HERBERT STARK, subjects of the King of Great Britain and Ireland, residing at 71 Bexley road, Erith, in the county of Kent, England, and 26 Barclay road, Leytonstone, in the county of Essex, England, respectively, have invented certain new and useful Improvements in and Relating to Motive-Power Means for Utilizing the Energy of Air-Currents, of which the following is a specification.

This invention comprises improvements in and relating to motive power means for utilizing the energy of air currents. The object of the invention is to provide an improved and efficient apparatus of the type comprising a turbine arranged at the throat of a mouth piece device and also to make improved arrangements of motive power means, such as dynamos or air compressors in combination with the turbine.

Heretofore, the mouthpiece was a cowl or funnel disposed in front of the turbine to act as an air scoop and collect a maximum quantity of air and direct it on to the turbine at the throat, at which latter point increased pressure and velocity were observed. Such devices are quite unsuitable for high velocity winds and currents such as are encountered by air-craft in some districts where really high winds are prevalent.

Now, according to this invention the mouth piece is of vena contracta formation, interiorly, the exterior being designed to prevent eddying behind the mouthpiece and to increase the efficiency of the device. The vena contracta formation is such that a predetermined quantity of air taken in at a given relative air speed has its initial velocity accelerated to a pre-determined final velocity at the throat, so that the turbine may be adapted for absorbing the impulsive energy due to the velocity and weight of the accelerated air. Thus the device according to this invention is distinguished, primarily, by the fact that it takes in and accelerates only a sufficient quantity of air for producing the desired power and has the effect of imparting a high degree of acceleration to the air taken in in an efficient manner and to increase the efficient action of the mouthpiece, the latter is inclosed by a casing part suitably designed to prevent eddying behind the mouth piece. Not only the mouth piece, but the turbine and power generator driven thereby may be inclosed in a casing of stream line formation and this casing may be adapted for entraining and accelerating the rearward movement of the exhaust air from the turbine. For example ports may be placed at proper angles for taking advantage of the exterior passing air as an entraining medium, and so that a partial vacuum is set up inside the casing. This induction is very advantageous, because the turbine wheel blades should be designed to receive the air from properly shaped guide blades without friction or shock and to leave the air on the other side in a relatively stationary condition, and by inducing the air to flow away from the rear of the wheel, the efficiency is increased. One or several rows of running and guide blades may be used according to circumstances.

When a dynamo is used as the power generator, it is advantageously coupled with the turbine in the immediate path of the exhaust air current and the dynamo is preferably constructed with air passages or with devices for enabling the air current to exert a maximum cooling effect.

The placing of the ports in the casing would materially affect the cooling effect produced.

The governing of the machine may be accomplished either by more or less closing of the inlet or, as is preferred, by throttling or more or less closing of the exhaust, and automatic means may be readily adapted for this purpose. The governing might also be accomplished by adjusting the guide blades or by a combination of the methods aforesaid. The governing should be arranged so that preferably at all times a draft is permitted through the dynamo.

The apparatus is adapted for use in any air current and may be employed as a wind motor by suitably mounting it upon a fixed support with the usual vane devices for keeping it head to wind or it may be used as a power generator in a wind tunnel or on a moving vehicle of any kind, and particularly on aerial craft. It will be readily understood that the vena contracta accelerator must be designed to suit the average speed of the air, and the power conditions required, in each particular application of the apparatus, and it is possible to obtain an indication of wind velocity, or of the number of relative air miles, by gearing a suitable counter or indicator with the turbine.

The entraining action behind the mouth piece may be developed to a maximum in order to secure appreciable additional velocity through the turbine wheel where the initial acceleration due to the vena contracta is not a maximum thereby securing a greater working velocity than would be possible by the use of either of the accelerating actions alone.

The turbine is preferably of the type comprising guide blades and running blades but it may be of the reaction nozzle type.

In order to enable this invention to be readily understood, reference is made to the accompanying drawings in which:—

Fig. 2 is a longitudinal section illustrating a modified construction.

Fig. 3 is a view illustrating a suitable throttling control for the exhaust air.

Fig. 4 is a diagrammatic longitudinal section of another form of vena contracta according to these improvements.

Figure 1:
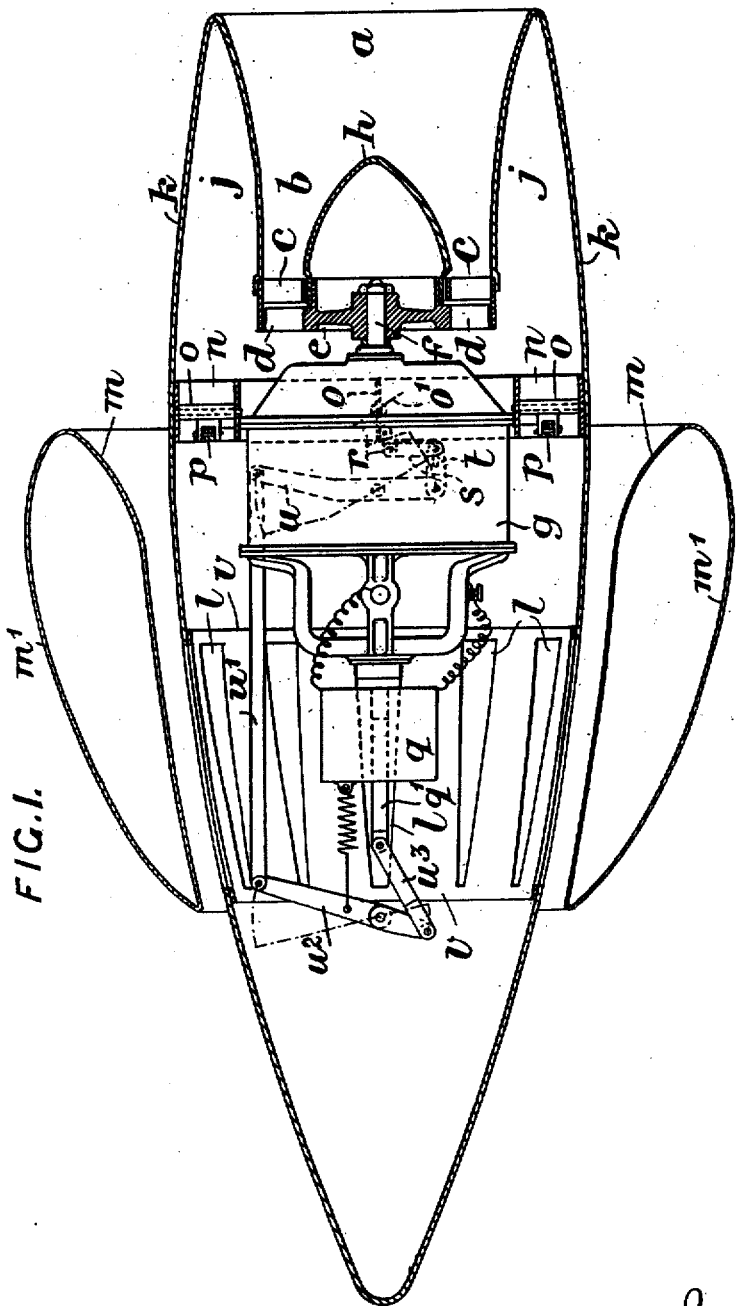
Figure 1 is a longitudinal section of an improved apparatus of the type in question, the whole of the operative parts being inclosed in a stream line casing.

Referring to Fig. 1, $a$ is the mouthpiece having the vena contracta formation and an annular throat $b$ in which are situated guide blades $c$ for directing air on to the wheel blades $d$ of the turbine $e$, the last-named being keyed to the spindle $f$ of the dynamo $g$. The vena contracta mouthpiece $a$ may have a gradually sloping inner wall such as shown in the drawing and the center of the mouthpiece is occupied by a conical device $h$ having a curved exterior. The point or apex of the device $h$ is situated in the rear of the wide mouth of the mouth piece and may be, as shown, about half way between the mouth and the base of the cone. The radial width of the annular throat $b$, in the example shown, is about one seventh the diameter of the mouth, and the length of the vena contracta is a little less than the diameter of the mouth. These dimensions are mentioned simply as examples in a suitable design for procuring a desirable degree of efficiency.

The space $j$ in the immediate rear of the mouth piece $a$ is inclosed by a casing part $k$ which may have a stream line formation and may extend rearwardly so far as to form a torpedo-like casing inclosing the whole of the operating parts. This casing $k$ is formed with suitable outlets or exhaust openings $l$, as for example, by forming a series of slots around the casing preferably in the rear of the dynamo as shown. Thus, as the exhaust air flows from the turbine $e$ to the outlets $l$ it passes over the dynamo $g$ and cools the same, the cooling effect being equal to or greater than that normally produced by fans and similar devices in commercial dynamos as at present designed. The dynamo may be constructed so as to allow the air currents to have access to the parts, which are most advantageously cooled, and, in this way the design of the electrical elements of the dynamo may be such as to obtain the maximum output at high efficiency. In order to facilitate or accelerate the outward flow of exhaust air, the openings $l$ may be fitted with steps, baffles, cones or other current inducing devices adapted to promote an entraining action under the influence of the wind, or air currents, passing over the casing and which, consequently, will induce the air to leave the casing at a sufficient velocity for insuring an efficient running of the turbine.

The ported stream line casing $k$ has the effect of reducing the head and other resistances to a minimum. Indeed the current conditions around this casing are about as favorable as would be the case with a solid stream line body of similar dimensions.

If desired, a second vena contracta arrangement $m$ may be fitted exteriorly of the casing $k$ and in such manner that the throat of the device is at or near the place where the openings $l$ are situated. The accelerator device $m$ has the form of a current inducing or entraining device for causing air to flow out of the casing $k$ and thereby effecting quick removal of air from the rear of the turbine wheel blades $d$. This second vena contracta $m$ is advantageously inclosed by an outer casing part $m^1$ of stream line formation so as to avoid all possible losses.

The control of the apparatus under varying conditions is preferably automatic and is suitably accomplished by throttling in the rear of the turbine. For example the annular exhaust passage $n$ between the dynamo $g$ and the casing $k$ may be fitted with a number of valves or shutters $o$ under the control of a common operating ring $p$. The latter may be linked to the armature or core of an electromagnet or solenoid $q$ connected for example, across the dynamo terminals. For instance, and as indicated by dotted lines, the ring $p$ has a lug $r$ connected by a link $s$ with a short lever arm $t$ which is turned in one direction or the other by a long lever arm $u$ suitably connected by link $u'$, lever $u^2$ and connecting rod $u^3$ with the solenoid core $q'$. Under excessive speed conditions, the core $q$ of the magnet or solenoid $q$ moves the levers and linkage to the position indicated by chain lines in Fig. 1, and operates the ring $p$ and the latter operates the valve $o$ to more or less close the exhaust passage $n$, as indicated by the chain line $o'$, thereby reducing the speed of the turbine, as will be readily understood. A centrifugal governor may be substituted for the solenoid and the governor springs may be arranged to operate upon a part having a relatively considerable amplitude of movement, such as the outer end of lever arm $u$ thereby giving a relatively long scale spring as compared with that necessary or practicable if the springs be directly applied to a governor running at turbine speeds.

In an alternative arrangement which is also illustrated in Fig. 1, a revoluble slotted liner or shell $v$ is arranged within the casing $k$ and so that normally, the slots in the liner register with the exhaust openings $l$ in the casing $k$. This liner $v$ is connected in any suitable manner with the magnet or solenoid or governor aforesaid, so that under excessive speed conditions the magnet or solenoid causes the liner to revolve so as to more or less close the exhaust openings.

The dynamo $g$ may be formed with passages through its parts for the exhaust air to pass through for cooling purposes. If desired, the tail end of the casing $k$ may be removed in which case the wind influence on the casing would have the effect of withdrawing the exhaust air from behind the turbine and out at the open tail.

As seen in Fig. 3 an iris diaphragm arrangement may be employed for governing the exhaust. The leaves $w$ of the iris may be pivotally mounted upon the rotor $e$ and may be normally held toward the center, against the action of centrifugal force, by a spring band device $x$ passed over studs or projections $y$ on the leaves $w$. When the speed becomes excessive the leaves move outward, under the action of centrifugal force and against the action of the spring band $x$, and cover more or less of the annular opening behind the rotor vanes $d$, thereby effectually throttling the turbine. The arrangement seen in Fig. 3 may be employed for governing the inlet if disposed between the guide blades and running blades.

In Fig. 2 parts already described with reference to Fig. 1 are marked with the same reference characters as in Fig. 1. In Fig. 2 the mouth piece $a$ and the cone $h$ are shaped somewhat differently from those seen in Fig. 1, but they are nevertheless designed to achieve the same effect, namely to produce acceleration and not pressure of the air entering the open mouth of the part $a$. In Fig. 2 part of the air exhausting from the turbine blades $d$ passes out of the casing $k$ by way of the openings 2, deflectors 3 being arranged at the openings 2 for increasing the inductive effect of the outside current on the exhaust air. The dynamo $g$ is supported in the casing $k$ by six or eight ribs 1 and 4. The remainder of the exhaust air is therefore, free to pass over the parts of the dynamo and some may pass through the dynamo, if desired, in order to cool the same, this exhaust air finally escaping through the rear openings 5 which may be fitted with suitable deflectors 6. Around the openings 2 and that portion of the casing $k$ adjacent thereto, is fitted a tubular part 7 of larger diameter than the casing $k$ at that part. This tubular part 7 has the effect of increasing the inductive action on the air exhausting through the openings 2, as will be readily understood. The solenoid $q$ in this construction is situated in the tail part of the casing and the speed is controlled by a sleeve 8 slidably mounted by means of the guide tubes 9 on fixed guide rods 10 and suitably connected by rods 80 and arms 81 with the core of the solenoid. Under excessive speed conditions, the solenoid pulls the sleeve 8 toward the left hand and thereby effects a throttling of the exhaust passage for the purpose of reducing the speed of the turbine. Additional exhaust openings 11 may be formed in the tail part of the casing if desired, or the tail may be open as above described with reference to Fig. 1.

In Fig. 4 is illustrated another example of a vena contracta constructed according to these improvements. In this construction the inner wall of the mouth piece $a$ is about cylindrical and the acceleration of the air flowing through the same is entirely due to the form or contour of the center piece $h$.

In all the constructions, the head resistance is minimized and equilibrium is produced behind the mouthpiece by recombining in the partial vacuum naturally formed, the air currents passing through the turbine and those passing over the outside of the device.

We claim:—

1. Means for utilizing the kinetic energy of air currents comprising in combination, a mouthpiece device of vena contracta formation, a turbine arranged at the throat of said device, and a stream line surface disposed exteriorly of said mouthpiece and adapted to assist in the clearance of the exhaust from said turbine.

2. Means for utilizing the kinetic energy of air currents comprising in combination, a mouthpiece device of vena contracta formation, a turbine arranged at the throat of said device, a casing part inclosing said mouthpiece, and means for causing the air currents passing over the outside of the casing to entrain and assist the flow of air through the interior of the casing.

3. Means for utilizing the kinetic energy of air currents comprising in combination, a mouthpiece device of vena contracta formation, a turbine arranged at the throat of said device, a ported streamline casing part inclosing said mouthpiece, and means on said casing for inducing the flow of an air current from ports in the casing at the rear of the said throat and for re-combining with a minimum of disturbance the air currents passing through the casing and turbine and those passing over the outside of the casing.

4. Means for utilizing the kinetic energy of air currents comprising the combination of a mouthpiece device of vena contracta formation, a turbine arranged at the throat of the vena contracta, a power generator coupled with the turbine, and a ported streamline casing inclosing the whole.

5. Means for utilizing the kinetic energy of air currents comprising in combination a mouth piece device of vena contracta formation, a turbine arranged at the throat of said device, a dynamo operatively connected with said turbine, and a stream line casing inclosing the parts substantially as set forth.

6. Means for utilizing the kinetic energy of air currents comprising in combination a mouth piece of vena contracta formation, a turbine arranged at the throat of said mouth piece, a dynamo operatively connected with said turbine a casing inclosing the aforesaid parts and adapted for conveying a current of air over said dynamo, and current inducing means on said casing adapted for inducing a flow of air from said casing under the influence of the exterior current substantially as set forth.

7. Means for utilizing the kinetic energy of air currents comprising in combination a mouth piece of vena contracta formation, a turbine arranged at the throat of said mouth piece, a dynamo operatively connected with said turbine, a casing inclosing the mouth piece, turbine and dynamo, said casing being fitted with ports, and means in connection with said ports adapted to facilitate the extraction of air therefrom by the action of the external air current substantially as set forth.

8. Means for utilizing the kinetic energy of air currents comprising in combination a mouth piece of vena contracta formation, a turbine arranged at the throat of said mouth piece, a power generator operatively connected with said turbine, a casing part inclosing said mouth piece and designed to prevent eddying behind the mouth piece, throttling means operative at the throat of said mouth piece and speed responsive governing means operatively connected with said throttling means.

9. Means for utilizing the kinetic energy of air currents comprising in combination a mouth piece of vena contracta formation, a turbine arranged at the throat of said mouth piece, a dynamo operatively connected with said turbine, a casing part inclosing said mouth piece and designed to prevent eddying behind the mouth piece, throttling means disposed on the exhaust from said turbine, and speed-responsive governing means operatively connected with said throttling means.

10. Means for utilizing the kinetic energy of air currents comprising in combination a mouth piece of vena contracta formation, a turbine arranged at the throat of said mouth piece a dynamo operatively connected with said turbine, a casing part inclosing said mouth piece and designed to prevent eddying behind said mouth piece, throttling means operative at the throat of said mouth piece, and electromagnetic means energized by said dynamo and operatively connected with said throttling means.

11. Means for utilizing the kinetic energy of air currents comprising in combination a mouth piece of vena contracta formation, a turbine arranged at the throat of said mouth piece, a power generator operatively connected with said turbine, a stream line casing inclosing the mouth piece, turbine and power generator, said casing being formed with exhaust ports, and an outer ring-shaped part surrounding said casing in the vicinity of said ports and forming with said casing a vena contracta device substantially as set forth.

12. Means for utilizing the kinetic energy of air currents comprising in combination a mouth piece of vena contracta formation, a turbine arranged at the throat of said mouth piece, throttling means disposed at the throat of said mouth piece, a power generator operatively connected with said turbine, a stream line casing inclosing said mouth piece turbine and power generator and having exhaust ports formed in it, deflector devices arranged against respective ports, a ring-shaped part surrounding said casing in the vicinity of said ports and forming with said casing a vena contracta device, and speed responsive governing means driven by said turbine and operatively connected with said throttling means substantially as set forth.

WILLIAM JOHN DICKINSON.
ARTHUR HERBERT STARK.